United States Patent
Ambeskar et al.

(10) Patent No.: US 12,088,404 B2
(45) Date of Patent: Sep. 10, 2024

(54) BURST MODE COMMUNICATIONS

(71) Applicant: Hughes Network Systems, LLC, Germantown, MD (US)

(72) Inventors: Nimesh Ambeskar, Germantown, MD (US); Hanhui Zhang, Clarksburg, MD (US); Ashritha Mohan Ram, Germantown, MD (US); Jingyuan Liang, San Jose, CA (US); Akash Gaikwad, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 191 days.

(21) Appl. No.: 17/819,000

(22) Filed: Aug. 11, 2022

(65) Prior Publication Data

US 2024/0056178 A1    Feb. 15, 2024

(51) Int. Cl.
*H04B 7/212* (2006.01)
*H04B 1/16* (2006.01)

(52) U.S. Cl.
CPC ............ *H04B 7/212* (2013.01); *H04B 1/16* (2013.01)

(58) Field of Classification Search
CPC .................................. H04B 7/212; H04B 1/16
See application file for complete search history.

(56) References Cited

U.S. PATENT DOCUMENTS

| | | | | |
|---|---|---|---|---|
| 4,726,040 A | * | 2/1988 | Acampora | H04B 7/212 370/442 |
| 2003/0099243 A1 | * | 5/2003 | Oh | H04Q 11/0066 370/395.21 |
| 2012/0128047 A1 | * | 5/2012 | Cannon | H04L 1/0071 375/222 |
| 2018/0219613 A1 | * | 8/2018 | Arnaud | H04N 21/43607 |
| 2022/0149930 A1 | * | 5/2022 | Rolle | H04L 5/0048 |
| 2022/0210787 A1 | | 6/2022 | Ambeskar et al. | |

OTHER PUBLICATIONS

International Search Report and Written Opinion for PCT/US2023/067440 mailed Sep. 18, 2023 (12 pages).

* cited by examiner

*Primary Examiner* — Freshteh N Aghdam
(74) *Attorney, Agent, or Firm* — Bejin Bieneman PLC (57) ABSTRACT

A burst mode time division multiple access (TDMA) data processing system can determine burst time plans (BTPs). The burst mode TDMA data processing system can receive burst mode time division multiple access (TDMA) data. The burst mode TDMA data can be distributed among processors based on the BTPs. The distributed burst mode TDMA data can be demodulated and decoded the using the processors and the demodulated and decoded burst mode TDMA data can be output.

20 Claims, 6 Drawing Sheets

BURST MODE COMMUNICATIONS

BACKGROUND

Satellite communications can provide wireless communications over a large area of the Earth's surface, e.g., for Internet access, enterprise intranet connectivity, TV (television) broadcasting services, etc. Respective satellites' coverage of the Earth's surface may overlap. A satellite beam may communicate with terrestrial terminals via multiple carriers. A terrestrial terminal may select a carrier from a satellite beam with beams covering a location of the terrestrial terminal based on data specifying various carriers of a satellite beam.

SUMMARY

A computing device in a satellite can process incoming burst mode time domain multiple access (TDMA) data streams received from remote terminals. The remote terminals can be terrestrial terminals. Burst mode TDMA data streams are described in relation to FIGS. 2 and 3. A computing device in a satellite can include a plurality of processors to process burst mode TDMA data streams. Advantageously, techniques described herein can determine burst time plans (BTPs) that describe the composition of incoming burst mode TDMA data streams and process the BTPs to determine load balancing between a plurality of processors dedicated to burst mode TDMA data stream processing. Determining load balancing between the processors can maximize system throughput, i.e., data can be more efficiently and effectively sent through the system.

Disclosed herein is a method, including determining burst time plans (BTPs), receiving burst mode time division multiple access (TDMA) data, distributing the burst mode TDMA data among processors based on the BTPs, demodulating and decoding the distributed burst mode TDMA data using the processors, and outputting the demodulated and decoded burst mode TDMA data. Determining the BTPs can be based on packet sizes of burst mode TDMA data to be received. Determining the BTPs can include sorting the BTPs in descending order based on one or more of channel symbol rate and channel data rate and distributing the burst mode TDMA data to channel groups in round robin fashion in the sorted order. Distributing the burst mode TDMA data can include distributing the burst mode TDMA data in each channel group to one of the second processors based on the sorted BTPs.

Distributing the burst mode TDMA data can include validating that a current group capacity does not exceed a current channel group capacity before distributing the burst mode TDMA data to the channel group. Demodulating the burst mode TDMA data can include filtering a high frequency modulation carrier wave and decoding the burst mode TDMA data comprises converting symbols into binary data. The burst mode TDMA data can include data encoded at different symbol rates. The BTPs for the burst mode TDMA data can be determined as the burst mode TDMA data is received. The BTPs can be sorted in ascending order of burst finishing time and the burst mode TDMA data can be distributed to second processors in round robin fashion in the sorted order.

Further disclosed is a computer readable medium, storing program instructions for executing some or all of the above method steps. Further disclosed is a computer programmed for executing some or all of the above method steps, including a computer apparatus, programmed to determine burst time plans (BTPs), receive burst mode time division multiple access (TDMA) data, distribute the burst mode TDMA data among second processors based on the BTPs, demodulate and decode the distributed burst mode TDMA data using the second processors, and output the demodulated and decoded burst mode TDMA data. The instructions to determine the BTPs can include instructions to determine the BTPs based on packet sizes of burst mode TDMA data to be received. The instructions to determine the BTPs can include instructions to sort the BTPs in descending order based on one or more of channel symbol rate and channel data rate and distribute the burst mode TDMA data to channel groups in round robin fashion in the sorted order. The instructions to distribute the burst mode TDMA data can include instructions to distribute the burst mode TDMA data in each channel group to one of the second processors based on the sorted BTPs.

The instructions to distribute the burst mode TDMA data can include instructions to validate that a current group capacity does not exceed a current channel group capacity before distributing the burst mode TDMA data to the channel group. The instructions to demodulate and decode the burst mode TDMA data can include instructions to demodulate the burst mode TDMA data by filtering a high frequency modulation carrier wave, and to decode the burst mode TDMA data by converting symbols into binary data. The burst mode TDMA data can include data encoded at different symbol rates. The instructions to determine the BTPs for the burst mode TDMA data can include instructions to determine the BTPs as the burst mode TDMA data is received. The instructions can include instructions to sort the BTPs in ascending order of burst finishing time and to distribute the burst mode TDMA data to second processors in round robin fashion in the sorted order.

The instructions can include instructions to determine burst time plans (BTPs), receive burst mode time division multiple access (TDMA) data, distribute the burst mode TDMA data among second processors based on the BTPs by sorting the BTPs in descending order based on packet sizes and distributing the burst mode TDMA data to channel groups in round robin fashion in the sorted order, and then distribute the burst mode TDMA data in each channel group to one of the second processors based on the sorted BTPs, demodulate and decode the burst mode TDMA data using the second processors, and output the demodulated and decoded burst mode TDMA data. The instructions to distribute the burst mode TDMA data can include instructions to validate that a current group capacity does not exceed a current channel group capacity before distributing the burst mode TDMA data to the channel group.

DETAILED DESCRIPTION

Figure 1:
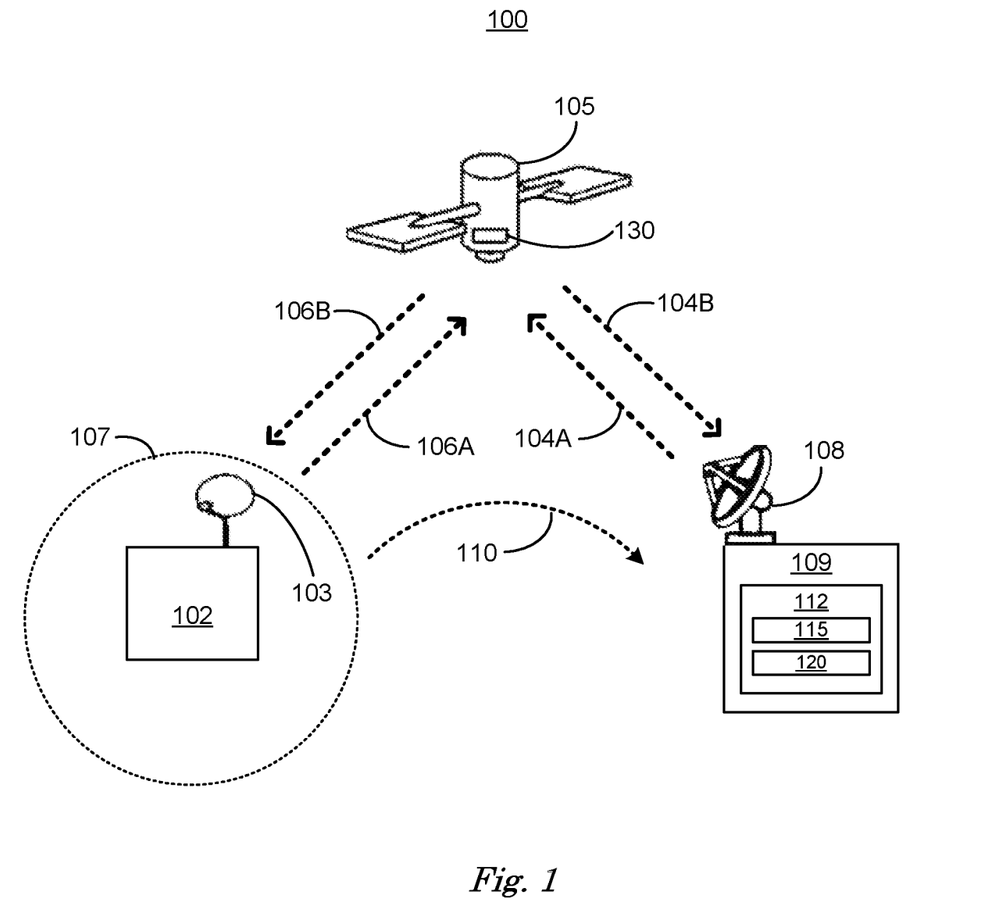
FIG. 1 is a diagram of an example satellite network.

FIG. 1 illustrates an example of a satellite network 100. Satellite network 100 includes a satellite gateway 109 included in a satellite groundstation. Satellite gateway 109, using a radio frequency (RF) antenna 108, can transmit uplink signals to a satellite 105 via an uplink 104A. Satellite 105 can receive the uplink signals via uplink 104A and can re-transmit those signals (possibly after amplification and/or frequency shifting) as downlink signals to devices in a coverage area 107 of satellite 105, via a downlink 106B. A terminal 102 in coverage area 107 can (e.g., using an RF antenna 103) receive downlink signals from satellite 105 via downlink 106B.

Devices in coverage area 107 can transmit uplink signals to satellite 105 via an uplink 106A. Satellite 105 can receive the uplink signals via uplink 106A and can re-transmit those signals (possibly after amplification and/or frequency shifting) as downlink signals to satellite gateway 109, via a downlink 104B. Resources of uplink 106A and downlink 104B can be allocated to support inroutes 110 for use by devices in coverage area 107 to transmit data to satellite gateway 109. An inroute 110 includes the electronic circuits and/or paths dedicated to an input signal including uplinks 104A, 106A, circuitry within a computing device 130 included in a satellite 105 and downlinks 104B, 106B. For instance, terminal 102 can use an inroute 110 to transmit data to satellite gateway 109.

As shown in FIG. 1, satellite gateway 109 and satellite 105 can include computing devices 112, 130. The computing devices 112, 130 can include processors 115 and memories 120. Memory 120 includes one or more forms of computer-readable media, and stores instructions executable by the processor for performing various operations, including as disclosed herein. Processor 115 can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). Processor 115 also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computing devices 112, 130 can include multiple processors (including processor 115), each one of which can be implemented according to any of the examples above.

A plurality of inroutes 110 can be defined and established for use by devices in coverage area 107 to transmit data to satellite gateway 109. The use of any particular one of such inroutes can involve transmission on uplink 106A via a different respective carrier frequency. A given device (e.g., terminal 102) in coverage area 107 may be able to transmit data to satellite gateway 109 via multiple inroutes 110. In order to do so, such a device can generate individual signals at the respective carrier frequencies of the multiple inroutes 110, combine those individual signals, and transmit the combined signal to satellite 105.

In some implementations, in conjunction with communicating over inroute 110, terminal 102 can perform data transmissions in accordance with a time-division multiple access (TDMA) channel access scheme. The TDMA channel access scheme can support both continuous-mode and burst mode TDMA transmissions. In some implementations, the TDMA channel access scheme can be one defined by DVB-S2 satellite digital broadcasting standards and DVB-S2x extensions to those standards. In some implementations, the TDMA channel access scheme can be one defined by Internet Protocol over Satellite (IPoS) standards. In some implementations, terminal 102 can transmit TDMA channel access data in DVB-S2x superframes consisting of 612,540 symbols.

Figure 2:
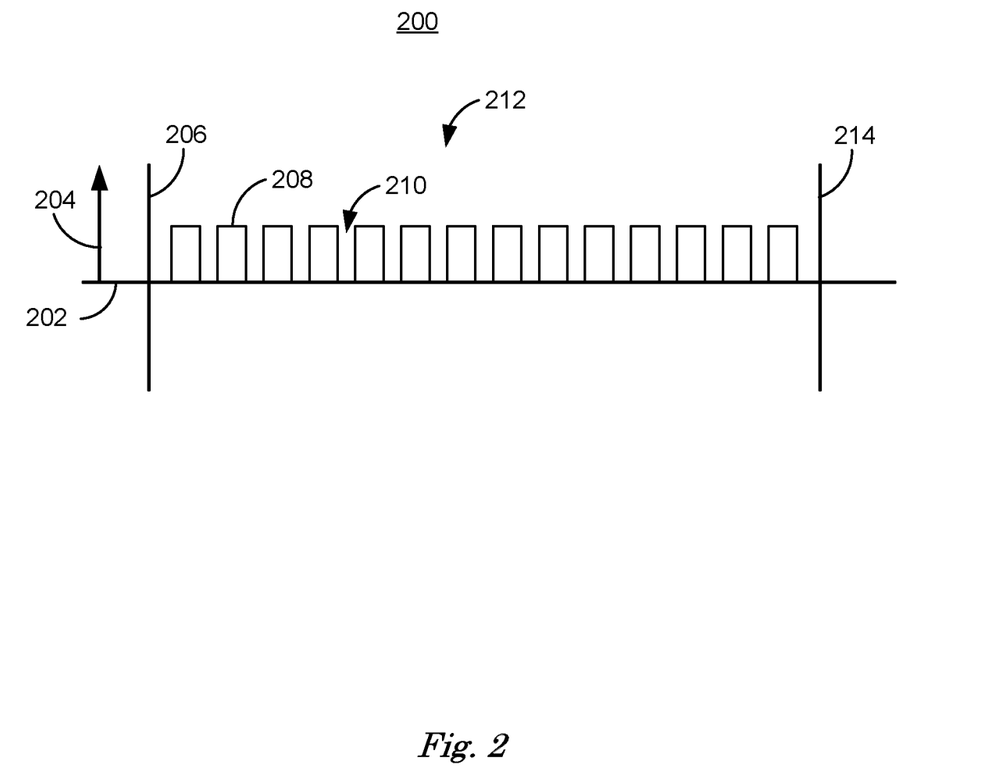
FIG. 2 is a diagram of an example time domain multiple access (TDMA) data stream.

FIG. 2 is a diagram of a time-division multiple access (TDMA) channel access scheme 200. The x-axis 202 indicates time and the y-axis 204 indicates signal strength as measured by voltage, for example. TDMA channel access scheme 200 includes a plurality of TDMA bursts 208 separated by ramp-up and ramp-down intervals 210. The plurality of TDMA bursts 208 can be collectively indicated as a frame 212 of TDMA bursts 208 and introduced by a start of frame pulse 206 and completed by an end of frame pulse 214. In some implementations, the TDMA channel access scheme can be one defined by Internet Protocol over Satellite (IPoS) standards. In some implementations, TDMA channel access scheme 200 can transmit data in 4 slot, 8 mega symbols per second (Msps) TDMA bursts 208. In other implementations, the sizes of TDMA bursts 208 included in TDMA channel access scheme 200 can be anywhere from 3 to 120 slots or more, and the TDMA bursts 208 can be transmitted at symbol rates of anywhere from 128 ksps (kilo symbols per second) to 24 Msps (mega symbols per second) or higher. In yet other implementations, the sizes of the TDMA bursts 208 and/or the symbol rates of TDMA burst transmissions can fall outside these ranges. A symbol is a multiple bit unit of data formed by an encoding scheme to increase the amount of data per unit time transmitted by a communication channel. For example, a plurality of offset phases of a carrier frequency can be combined to encode multiple bits of data at a single time period.

Figure 3:
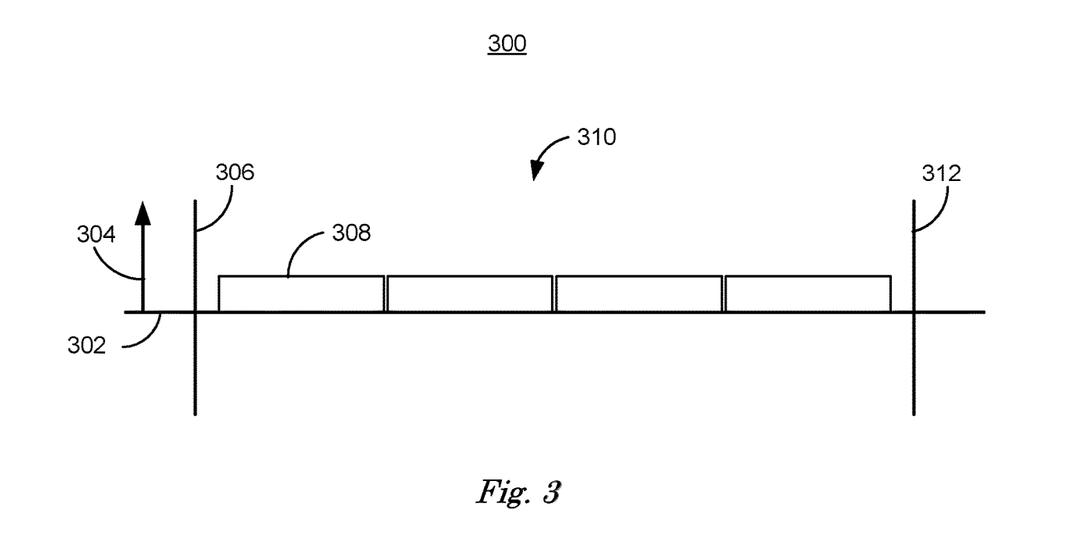
FIG. 3 is a diagram of an example burst mode TDMA data stream.

FIG. 3 is a diagram of a burst mode TDMA channel access scheme 300. The x-axis 302 indicates time and the y-axis 304 indicates signal strength as measured by voltage, for example. Burst mode TDMA channel access scheme 300 includes a plurality of TDMA frames 308. The plurality of TDMA frames 308 can be collectively indicated as burst mode TDMA data 310 and be introduced by a start of burst mode pulse 306 and completed by an end of burst pulse 312. Burst mode TDMA data 310 can include burst mode TDMA transmissions from a plurality of terminals 102 or satellite gateways 109 and include a plurality of inroutes 110.

Figure 4:
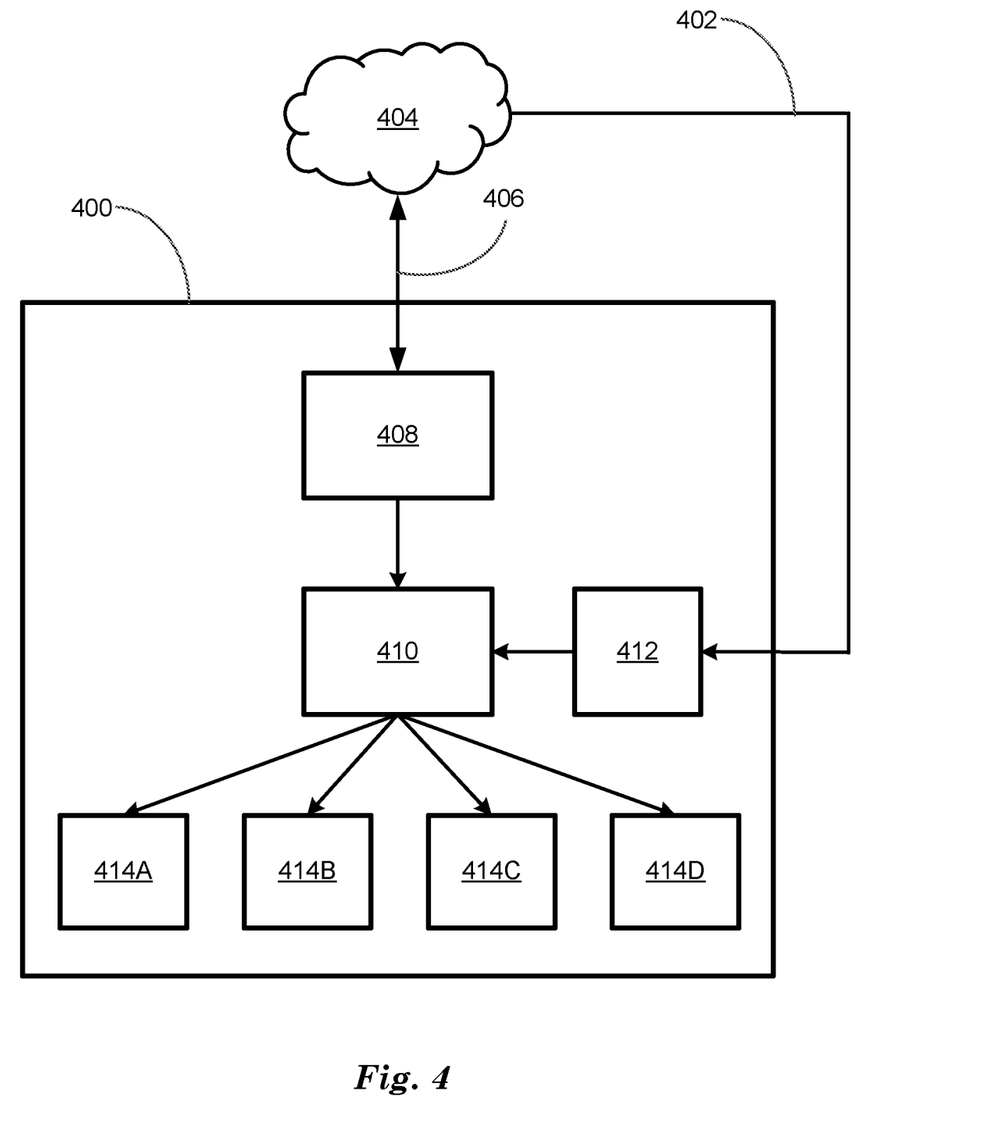
FIG. 4 is a block diagram of an example TDMA demodulator system.

FIG. 4 is a diagram of a TDMA demodulator system 400. TDMA demodulator system 400 can be included in a gateway 109 computing device 112 and used to process in inroutes 110 including burst mode TDMA data 402 input from a network 404. TDMA demodulator system 400 demodulates and decodes incoming burst mode TDMA data 402 from a plurality of terminals 102. Demodulating burst mode TDMA data 402 includes determining and subtracting a carrier wave from the burst mode TDMA data 402. Decoding burst mode TDMA data 402 includes converting symbols that encode multiple bits of digital data into a single multi-state symbol into a plurality of binary bits. Network 404 can include uplinks 106A communicating data from a plurality of terminals 102 transmitting TDMA bursts 208 combined as burst mode TDMA data 310. Burst mode TDMA channel access scheme 300 is a synchronous communication scheme and is determined based on data transferred via bidirectional communications links 406 to demodulator control 408. Demodulator control 408 is a software program executing on computing devices included in the TDMA demodulator system 400. Demodulator control 408 can execute at level 2 of a network control software stack, for example. Demodulator control 408 software assigns slots in TDMA bursts 208 to terminals 102 and receives data indicating the number and size of digital packets to be transmitted as TDMA bursts by terminals 102.

Demodulator control 408 determines burst time plans (BTPs) that are communicated to a channelizer processor 410. BTPs are discussed in relation to FIGS. 5 and 6, below. BTPs determine how burst mode TDMA data 402 is divided into channels to be input to burst processors 414A, 414B, 414C, 414D. Burst mode TDMA data 402 is input to RF analog processing 412 where the incoming analog data is digitized using analog-to-digital converters to convert the data to digital format. The digital data is input to channelizer processor 410 where it is sorted into N channels where N is the number of detected burst processors 414A, 414B, 414C, 414D. Some or all of the processors 410, 414 may be respective FPGAs, for example.

Burst processors 414A, 414B, 414C, 414D demodulate and decode the input digital burst mode TDMA data 402. Demodulation is a process for determining and filtering out high frequency modulation carrier waves included in the burst mode TDMA data 402. Digital symbol data included in the burst mode TDMA data 402 is modulated with a modulation carrier wave to permit a receiver in a computing device 130 in a satellite 105 to receive the burst mode TDMA data 402. The modulation carrier wave can be removed to permit the computing device 130 to decode the symbols included in the burst mode TDMA data 402 into digital packets of binary data for processing, re-modulation and re-transmission to terminal 102, for example.

Advantageously, TDMA demodulator system 400 divides the input burst mode TDMA data 402 into N channel groups that match the processing bandwidth of the burst processors 414A, 414B, 414C, 414D based on BTPs determined by demodulator control 408, where the BTPs are determined based on the channel symbol rate of the burst mode TDMA data packets to be received. The channel symbol rate is the number of symbols included in a burst of TDMA data 402. Channel symbol rate is also referred to as channel data rate herein. The N channel groups including burst mode TDMA data 402 are then assigned to the burst processors 414A, 414B, 414C, 414D to output data in round robin fashion in a channel symbol rate or channel data rate sorted order. By sorting the input burst mode TDMA data 402 into N channel groups that match the processing bandwidth of the burst processors 414A, 414B, 414C, 414D, TDMA demodulator system 400 can maximize the throughput of a satellite 105 given the amount of computing resources indicated by the burst processors 414A, 414B, 414C, 414D.

The first part of the process for demodulating the burst mode TDMA data 402 by TDMA demodulator system 400 includes delivery of remote terminal burst time plans (BTPs) to the demodulator control 408 software process executing on the TDMA demodulator system 400. The BTPs are references in time for the TDMA demodulator system 400 to detect and process a burst expected to be transmitted by a terminal at an upcoming frame time. The second part of the process involves demodulating and decoding of the burst mode TDMA data 402 by the burst processors 414A, 414B, 414C, 414D. The TDMA demodulator system 400 can process the BTPs and its corresponding burst mode TDMA data 402 using two types of processors, e.g., two types of FPGAs. The first is channelizer processor 410 and the second is burst processors 414A, 414B, 414C, 414D. The channelizer processor 410 receives the BTPs from the demodulator control 408 software and the corresponding channel data, transmitted by the terminals, from its tuned channels included in RF analog processing 412. The channelizer processor 410 passes on the burst mode TDMA data 402 indicated by time slots in the BTP to the burst processors 414A, 414B, 414C, 414D for burst processing which includes demodulation and decoding of the data.

TDMA demodulator system 400 is a high-throughput system where the demodulator achieves high capacity using a plurality of burst processors 414A, 414B, 414C, 414D and large number of channels per demodulator. The channelizer processor 410 routes a burst of burst mode TDMA data 402 to an individual burst processor 414A, 414B, 414C, 414D for burst processing. The individual burst processor 414A, 414B, 414C, 414D has a fixed capacity per unit time to process bursts and the total capacity of the demodulator can be scaled up by having large number of burst processors 414A, 414B, 414C, 414D. TDMA demodulator system 400 achieves high throughput by evenly balancing the burst processing load across these the of burst processors 414A, 414B, 414C, 414D to realize the maximum capacity of the TDMA demodulator system 400. To realize the maximum capacity of the TDMA demodulator system 400, the demodulator control 408 software processes and delivers the large number of BTPs to the channelizer processor 410 in a timely fashion.

Figure 5:
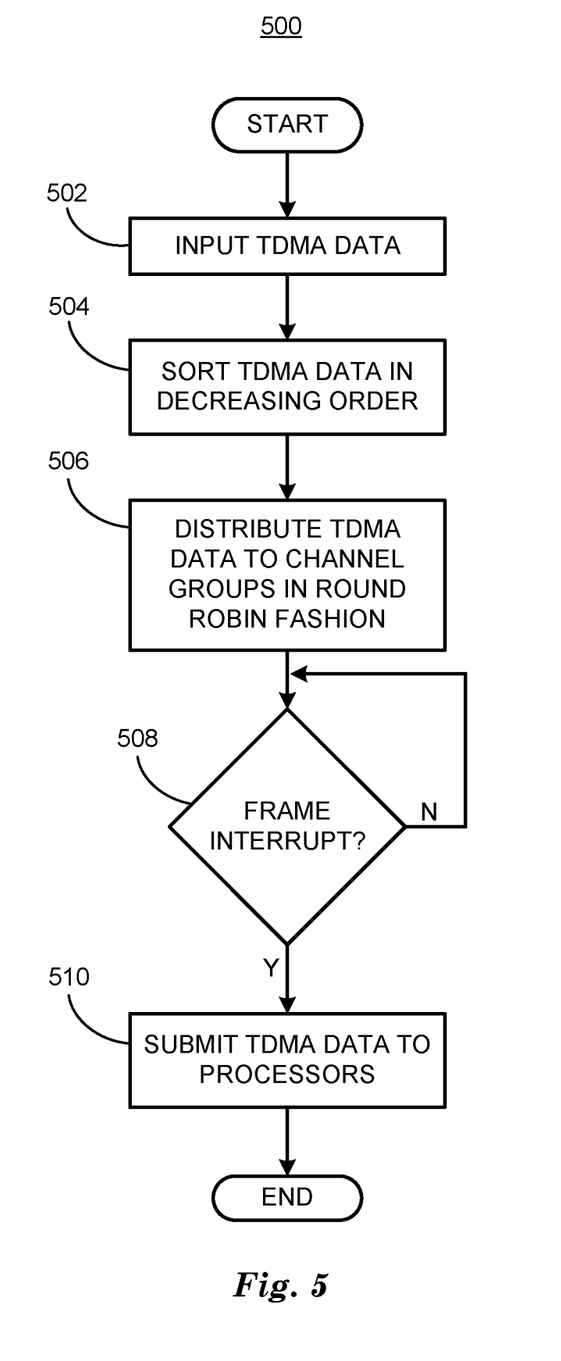
FIG. 5 is a flowchart diagram of an example process for burst time plan processing.
Figure 6:
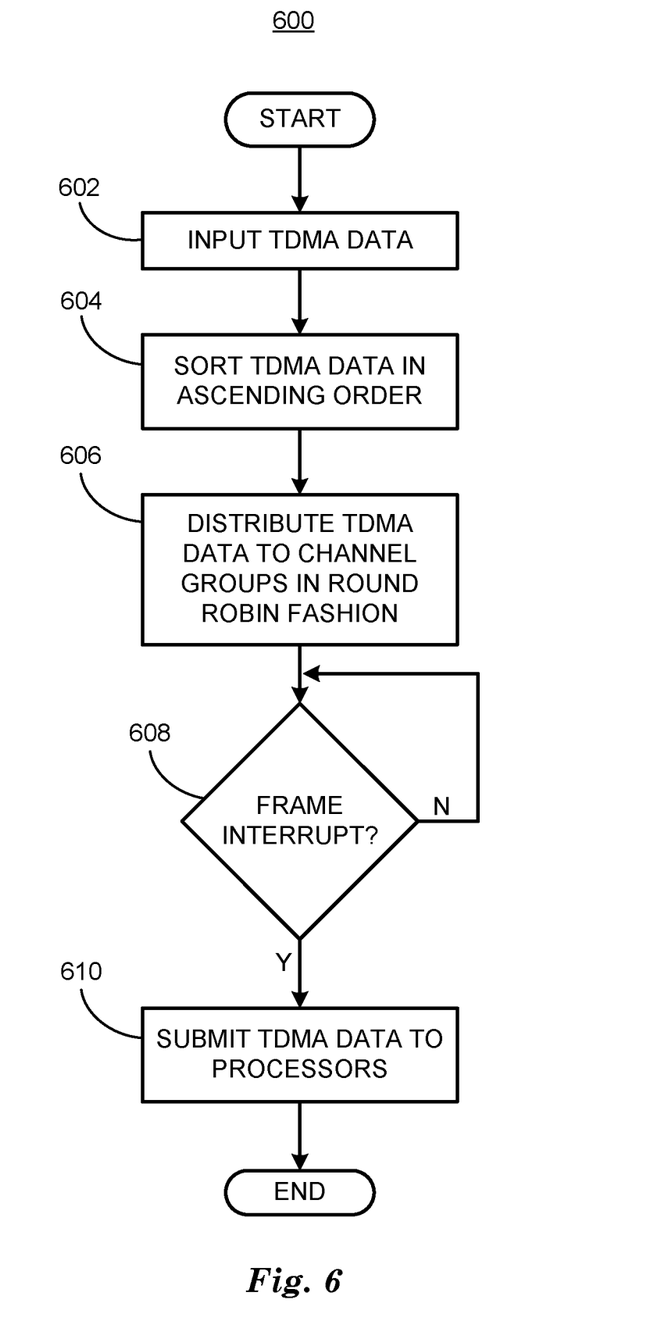
FIG. 6 is a flowchart diagram of another example process for burst time plan processing.

Sorted BTPs can be assigned to burst processors 414A, 414B, 414C, 414D in round robin fashion by either of two techniques. The first, illustrated in FIG. 5, is a static technique where a group of channels are created and assigned to the burst processors 414A, 414B, 414C, 414D based on burst mode TDMA data packet symbol rates. This first technique typically depends upon the symbol rates for all of the different input streams being the same. The second technique, illustrated in FIG. 6, is a dynamic technique wherein the BTPs are generated on the fly as the burst mode TDMA data are received and can be used when the symbol rates of the various data streams included in the input burst mode TDMA data 402 are encoded at different symbol rates. Burst mode TDMA data can be encoded at different symbol rates because of differing modulation frequencies.

FIG. 5 is a flowchart, described in relation to FIGS. 1-4 of a process 500 for determining BTPs for demodulating burst mode TDMA data 402. Process 500 can be implemented by a processor of a computing device 130. Process 500 includes multiple blocks that can be executed in the illustrated order. Process 500 could alternatively or additionally include fewer blocks or can include the blocks executed in different orders.

Process 500 begins at block 502, where demodulator control 408 receives data regarding inroutes 110. Terminals 102 can transmit requests to demodulator control 408 for transmission services from TDMA demodulator system 400. TDMA transmission is a synchronous transmission protocol, where in terminals 102 are assigned time slots within a burst mode TDMA channel access scheme 300 by TDMA demodulator system 400. Demodulator control 408 determines BTPs for each inroute 110 based on frames of TDMA data. In TDMA demodulator system 400 the maximum BTPs to process by demodulator control 408 are the equivalent of 900 Msps of total channel capacity. The demodulator control 408 software process can finish the BTP processing of 900 Msps of inroute 110 capacity within the 45 ms (millisecond) frame time typical for a frame of burst mode TDMA data 402.

At block 504 demodulator control 408 sorts the BTPs by symbol rate. Symbol rate is the number of symbols in an inroute 110 as indicated by a BTP to be processed in the next frame of burst mode TDMA data 402 to be received.

At block 506 the sorted BTPs are distributed to N channel groups in round robin fashion in descending order of symbol rate starting with the largest BTP. The channelizer processor 410 receives BTP messages from demodulator control 408 every 45 ms for a frame worth of time plans across all the channels to be serviced by the TDMA demodulator system 400. It maintains N receive buffers with list of inroutes 110 mapped to each of the N receive buffers. The channelizer processor 410 parses the BTP for inroute 110 number and transfers a BTP including an allocation record to one of the receive buffers. The current group capacity is validated by determining processing capacity for each burst processor 414A, 414B, 414C, 414D and then determining the total capacity per channel group as each BTP is added to a channel group to insure that the current channel group capacity of the burst processors 414A, 414B, 414C, 414D is not exceeded.

New channels indicated by new inroutes 110 being added during processing can be added to the existing channel groups in round robin fashion. Deleted channels indicated by inroutes 110 being dropped by the TDMA demodulator system 400 are deleted from the channel groups to ensure that the current capacity of the channel groups is maintained. The BTPs in the receive buffer are processed by a BTP conversion and processing thread that converts the BTP to a hardware format for input to the burst processors 414A, 414B, 414C, 414D. A processing thread is a unit of processing code that can be executed and managed independently from other processing threads by a computer operating system. A hardware format is a data format that can be input to a hardware device such as an FPGA. The processed BTP which is in the hardware format is placed into a designated BTP queue for output to the burst processors 414A, 414B, 414C, 414D. The channelizer processor includes N groups of channels that are processed by N processing threads in parallel utilizing N input receive buffers and N output buffers for N burst processors 414A, 414B, 414C, 414D.

At block 508 process 500 checks to determine whether a frame interrupt signal has been received by TDMA demodulator system 400. A frame interrupt signal is determined based on a start of frame pulse 206 that indicates that a frame of burst mode TDMA data 402 is being input to RF analog processing 412.

At block 510 the N channel groups of burst mode TDMA data 402 indicated by the BTPs are transmitted by channelizer processor 410 to the indicated burst processors 414A, 414B, 414C, 414D for demodulation and decoding. Following block 510, process 500 ends.

FIG. 6 is a flowchart, described in relation to FIGS. 1-4 of a process 600 for determining BTPs for demodulating burst mode TDMA data 402. Process 600 can be implemented by a processor of a computing device 130. Process 600 includes multiple blocks that can be executed in the illustrated order. Process 600 could alternatively or additionally include fewer blocks or can include the blocks executed in different orders.

Process 600 begins at block 602, where demodulator control 408 receives data regarding inroutes 110. Terminals 102 can transmit requests to demodulator control 408 for transmission services from TDMA demodulator system 400. TDMA transmission is a synchronous transmission protocol, where in terminals 102 are assigned time slots within a burst mode TDMA channel access scheme 300 by TDMA demodulator system 400. Demodulator control 408 determines BTPs for each inroute 110 based on frames of burst mode TDMA data 402. In TDMA demodulator system 400 the maximum BTPs to process by demodulator control 408 are the equivalent of 900 Msps of total channel capacity. By using BTPs to distribute burst mode TDMA data 402, demodulator control 408 software process can ensure the processing of 900 Msps of inroute 110 capacity within the 45 ms frame time for a frame of burst mode TDMA data 402.

At block 604 demodulator control 408 sorts the BTPs in ascending order of finishing time of the burst payload assignment, where finishing time is an end time of a burst payload assignment as determined relative to the start of burst mode pulse 306. Sorting BTPs in ascending order of burst finishing time permits inroutes 110 that included differing sample rates to be demodulated and decoded at the same time while maximizing system throughput.

At block 606 the sorted BTPs are distributed to the N burst processors 414A, 414B, 414C, 414D in round robin fashion starting with the largest BTP. The channelizer processor 410 receives BTP messages from demodulator control 408 every 45 ms for a frame worth of time plans across all the channels to be serviced by the TDMA demodulator system 400. The channelizer processor 410 maintains N receive buffers with list of inroutes 110 mapped to each of the N burst processors 414A, 414B, 414C, 414D. The channelizer processor 410 parses the BTP for inroute 110 number and transfers a BTP including an allocation record to one of the burst processors 414A, 414B, 414C, 414D. The BTPs in the channelizer processor 410 are processed by a BTP conversion and processing thread that converts the BTP to a hardware format for input to the burst processors 414A, 414B, 414C, 414D. The converted BTP is placed into a designated BTP queue for output to the burst processors 414A, 414B, 414C, 414D. The channelizer processor includes N processing threads in parallel utilizing N input receive buffers and N output buffers for N burst processors 414A, 414B, 414C, 414D. The current group capacity is validated by determining processing capacity for each burst processor 414A, 414B, 414C, 414D and then determining the total capacity per channel group as each BTP is added to a channel group to ensure that the processing capacity of the burst processors 414A, 414B, 414C, 414D is not exceeded.

At block 608 process 600 checks to determine whether a frame interrupt signal has been received by TDMA demodulator system 400. A frame interrupt signal is determined based on a start of frame pulse 206 that indicates that a frame of burst mode TDMA data 402 is being input to RF analog processing 412.

At block 610 the N channel groups of burst mode TDMA data 402 indicated by the BTPs are transmitted by channelizer processor 410 to the indicated burst processors 414A, 414B, 414C, 414D for demodulation and decoding. Following block 610 process 600 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
   a computer that comprises a first processor and a memory, the memory comprising instructions executable by the first processor to:
   determine burst time plans (BTPs);
   receive burst mode time division multiple access (TDMA) data;
   distribute the burst mode TDMA data among second processors based on the BTPs by sorting the BTPs in descending order based on one or more of channel symbol rate and channel data rate;
   demodulate and decode the distributed burst mode TDMA data using the second processors; and
   output the demodulated and decoded burst mode TDMA data.

2. The system of claim 1, wherein the instructions to determine the BTPs comprise instructions to determine the BTPs based on packet sizes of burst mode TDMA data to be received.

3. The system of claim 2, wherein the instructions to determine the BTPs comprise instructions to distribute the burst mode TDMA data to channel groups in round robin fashion in the sorted order.

4. The system of claim 3, wherein the instructions to distribute the burst mode TDMA data comprise instructions to distribute the burst mode TDMA data in each channel group to one of the second processors based on the sorted BTPs.

5. The system of claim 4, wherein the instructions to distribute the burst mode TDMA data comprise instructions to validate that a current group capacity does not exceed a current channel group capacity before distributing the burst mode TDMA data to the channel group.

6. The system of claim 1, wherein the instructions to demodulate and decode the burst mode TDMA data comprise instructions to demodulate the burst mode TDMA data by filtering a high frequency modulation carrier wave, and to decode the burst mode TDMA data by converting symbols into binary data.

7. The system of claim 1, wherein the burst mode TDMA data comprises data encoded at different symbol rates.

8. The system of claim 7, wherein the instructions to determine the BTPs for the burst mode TDMA data comprise instructions to determine the BTPs as the burst mode TDMA data is received.

9. The system of claim 8, wherein the instructions comprise instructions to sort the BTPs in ascending order of burst finishing time and to distribute the burst mode TDMA data to second processors in round robin fashion in the sorted order.

10. A method, comprising:
    determining burst time plans (BTPs);
    receiving burst mode time division multiple access (TDMA) data;
    distributing the burst mode TDMA data among processors based on the BTPs by sorting the BTPs in descending order based on one or more of channel symbol rate and channel data rate;
    demodulating and decoding the distributed burst mode TDMA data using the processors; and
    outputting the demodulated and decoded burst mode TDMA data.

11. The method of claim 10, wherein determining the BTPs is based on packet sizes of burst mode TDMA data to be received.

12. The method of claim 11, wherein determining the BTPs comprises distributing the burst mode TDMA data to channel groups in round robin fashion in the sorted order.

13. The method of claim 12, wherein distributing the burst mode TDMA data comprises distributing the burst mode TDMA data in each channel group to one of the second processors based on the sorted BTPs.

14. The method of claim 13, wherein distributing the burst mode TDMA data comprises validating that a current group capacity does not exceed a current channel group capacity before distributing the burst mode TDMA data to the channel group.

15. The method of claim 10, wherein demodulating the burst mode TDMA data comprises filtering a high frequency modulation carrier wave, and decoding the burst mode TDMA data comprises converting symbols into binary data.

16. The method of claim 10, wherein the burst mode TDMA data comprises data encoded at different symbol rates.

17. The method of claim 16, wherein the BTPs for the burst mode TDMA data are determined as the burst mode TDMA data is received.

18. The method of claim 17, comprising sorting the BTPs in ascending order of burst finishing time and distributing the burst mode TDMA data to second processors in round robin fashion in the sorted order.

19. A system, comprising:
    a computer that comprises a first processor and a memory, the memory comprising instructions executable by the first processor to:
        determine burst time plans (BTPs);
        receive burst mode time division multiple access (TDMA) data;
        distribute the burst mode TDMA data among second processors based on the BTPs by sorting the BTPs in descending order based on packet sizes and distributing the burst mode TDMA data to channel groups in round robin fashion in the sorted order, and then distribute the burst mode TDMA data in each channel group to one of the second processors based on the sorted BTPs;
        demodulate and decode the burst mode TDMA data using the second processors; and
        output the demodulated and decoded burst mode TDMA data.

20. The system of claim 19, wherein the instructions to distribute the burst mode TDMA data comprise instructions to validate that a current group capacity does not exceed a current channel group capacity before distributing the burst mode TDMA data to the channel group.

* * * * *